(12) United States Patent
Sakakibara

(10) Patent No.: US 6,433,515 B2
(45) Date of Patent: Aug. 13, 2002

(54) METHOD OF UPDATING THE CHARGING CHARACTERISTICS OF A CHARGING DEVICE AND A BATTERY

(75) Inventor: Kazuyuki Sakakibara, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 09/828,314

(22) Filed: Apr. 6, 2001

(30) Foreign Application Priority Data

Apr. 13, 2000 (JP) ........................................ 2000-112432

(51) Int. Cl.⁷ .................................................. H02J 7/00

(52) U.S. Cl. ........................................ 320/137; 702/63

(58) Field of Search ................................ 320/132, 134, 320/136, 137; 324/426; 455/67.1; 710/62; 702/63

(56) References Cited

U.S. PATENT DOCUMENTS

| | | | |
|---|---|---|---|
| 5,592,069 A | | 1/1997 | Dias et al. ................... 320/30 |
| 5,694,024 A | | 12/1997 | Dias et al. ................... 320/30 |
| 5,889,386 A | * | 3/1999 | Koenck ....................... 320/107 |
| 5,951,229 A | * | 9/1999 | Hammerslag ................. 104/34 |
| 6,119,179 A | * | 9/2000 | Whitridge et al. ........... 235/380 |
| 6,169,883 B1 | * | 1/2001 | Vimpari et al. ........... 379/27.01 |
| 6,331,762 B1 | * | 12/2001 | Bertness ..................... 320/134 |

* cited by examiner

Primary Examiner—Gregory Toatley
(74) Attorney, Agent, or Firm—Lyon & Lyon LLP

(57) ABSTRACT

Connecting to a home page via the Internet, selecting the mode of use of the battery desired by the user, downloading the charging characteristics which match the selected mode of use, and reading the charging characteristics into a EEPROM of charging device 30. Because of this, the optimal charging characteristics can be matched with the desires of the user and read into the EEPROM of the charging device.

5 Claims, 12 Drawing Sheets

Fig. 2
(A)
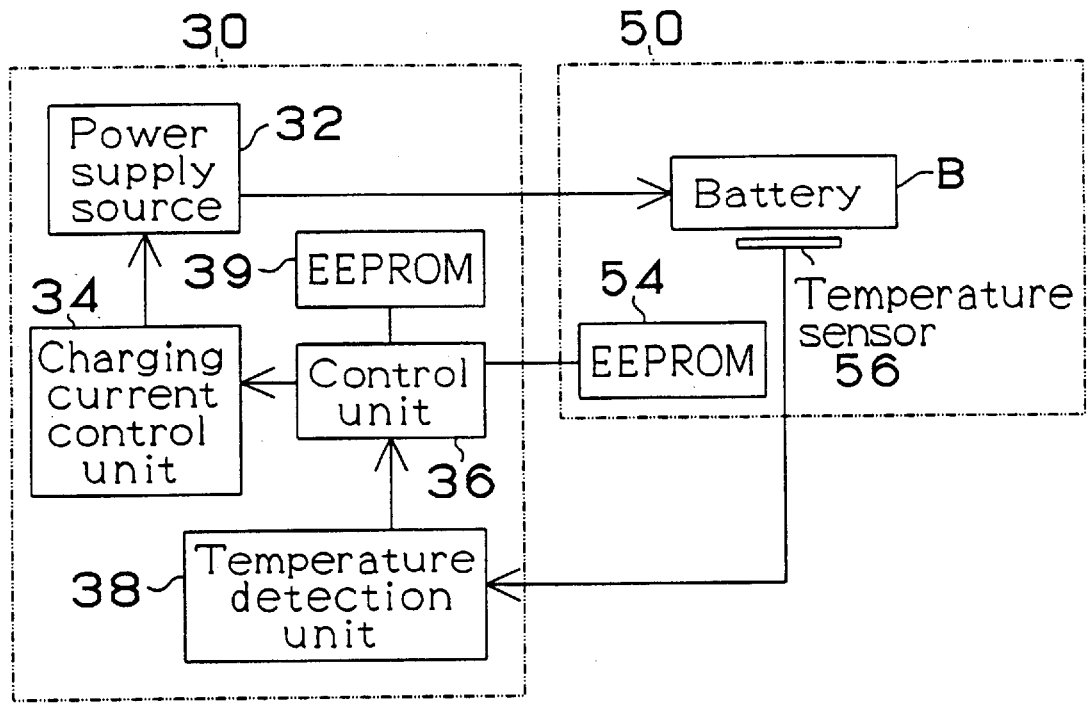
(B)
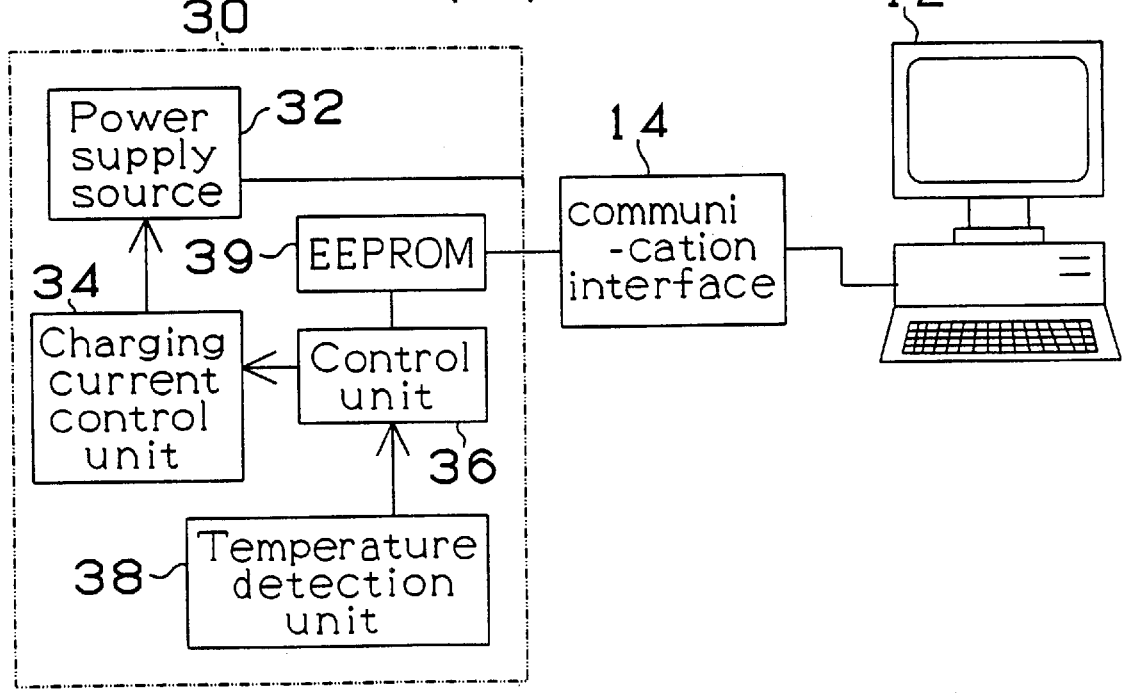

Fig. 3
(A)
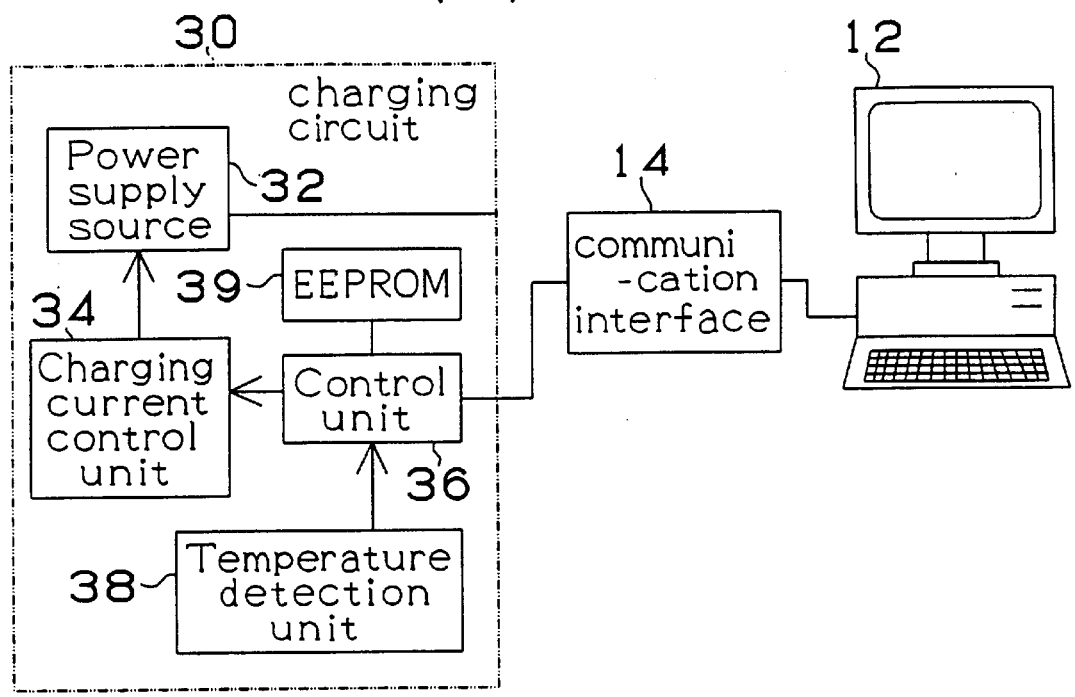
(B)
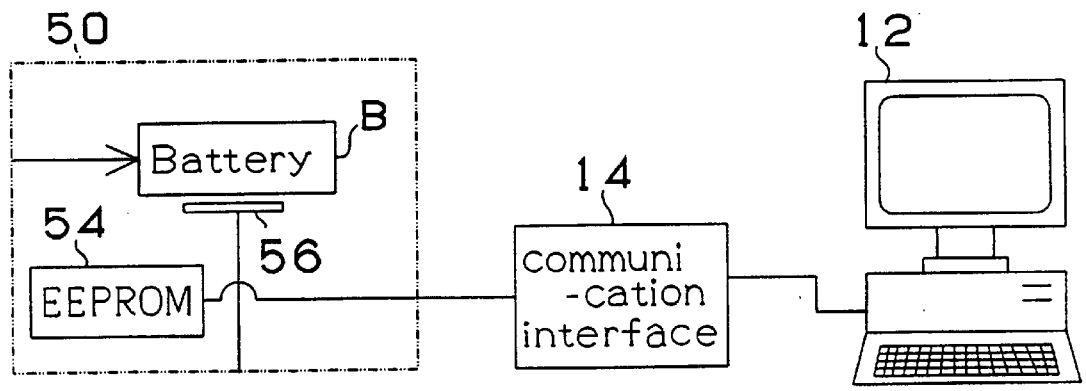

Fig.4

|  | | |T| | | | | |
|---|---|---|---|---|---|---|
|  | | ~T₁ | T₁~T₂ | T₂~T₃ | T₃~T₄ | T₄~ |
| dT/dt | ~X₁ | I₁₁ | I₁₂ | I₁₃ | I₁₄ | I₁₅ |
| | X₁~X₂ | I₂₁ | I₂₂ | I₂₃ | I₂₄ | I₂₅ |
| | X₂~ | I₃₁ | I₃₂ | I₃₃ | I₃₄ | I₃₅ |

Fig. 6
(A)

```
MK Home Page
Model of charging device used
    [N1]
Please select the battery to be used
    [M1]   [M2]
Please select the tool primarily used
  [Battery powered drill]  [Battery powered chain saw]
Please select region in which it will be used
    [North region]  [South region]
Please select the mode of use desired
   [Preference for        [Preference for
    long battery life]     short charging time]
```

(B)

```
MK Home Page
Model of battery used
    [M1]
Please select the charging device to be used
    [N1]   [N2]
Please select the tool primarily used
  [Battery powered drill]  [Battery powered chain saw]
Please select region in which it will be used
    [North region]  [South region]
Please select the mode of use desired
   [Preference for        [Preference for
    long battery life]     short charging time]
```

```
MK Home Page

Model of battery used
  [M1]

Please select the charging device to be used
  [N1]   [N2]

Please select the tool primarily used
  [Battery powered drill]  [Battery powered chain saw]

Please select region in which it will be used
  [North region]  [South region]

Please select the mode of use desired
  [Preference for    [Preference for
   long battery life] short charging time]
```

(B)

```
MK Home Page

Battery capacity exhausted.
  Please begin charging.

Battery normal.
  Can be used 300 times or more
```

METHOD OF UPDATING THE CHARGING CHARACTERISTICS OF A CHARGING DEVICE AND A BATTERY

BACKGROUND OF THE INVENTION

The present invention relates to a method of updating the charging characteristics of a charging device and a battery via the Internet.

Batteries which can be repeatedly recharged have recently come into use as a power source for power tools and the like. Nickel metal hydride batteries have begun to be used in these types of power tools, together with a charging device which rapidly recharges the battery by means of a large electric current. That is, because these batteries are rapidly charged in about 20 minutes, it is possible for one to continue to use a power tool by replacing a depleted battery with one which has been recharged.

Although the capacity of a nickel metal hydride battery can be larger than that of a nickel-cadmium battery, a large amount of heat is generated during charging. If the temperature of the battery reaches a high level due to this generated heat, the cell electrodes and the separator inside the battery deteriorate and shorten the life of the battery. Because of this, the present inventor employed a map to properly perform the charging, and proposed a method of controlling the charging current in Japanese published patent application Heisei 11-252814.

However, there are various modes of uses for user's batteries. In addition, the data in the aforementioned map is set for the greatest common denominators. Because of this, even if the aforementioned method of control is employed, an ideal charge cannot be achieved according to the mode of use.

Furthermore, users have stated that they want to be able to achieve a charge that suits their mode of use. For example, there are users who want to be able to use a battery for as long as possible, while on the other hand there are users who want charging to be completed in a short amount of time even though the life of the battery is shortened. The prior art cannot satisfy the individual demands of each user.

In order to solve the aforementioned problems, it is an object of the present invention to provide a method which can optimally update the charging characteristics of a charging device and a battery.

SUMMARY OF THE INVENTION

In order to achieve the above object, a method of updating the charging characteristics stored on a storage medium of a charging device and a battery via the Internet, according to the present invention comprises:

connecting the charging device and battery to a computer;

connecting to an information provider via the Internet, and selecting the mode of use of the battery that a user desires;

downloading via the Internet charging characteristics which match the selected mode of use, and writing the charging characteristics into the storage medium of the charging device and battery.

An information provider is connected to via the Internet, the mode of use that the user desires is selected, and the charging characteristics matching the mode of use selected is downloaded via the Internet and read into the storage medium of the charging device and battery. Because of this, the optimal charging characteristics can be matched with the desires of the user and can be written into the storage medium of the charging device and the battery.

A method of updating the charging characteristics stored on a storage medium of a charging device and a battery via the Internet, according to the present invention comprises:

connecting the charging device and battery to a computer;

connecting to an information provider via the Internet, and reading out an identifier of the charging device and battery connected to the computer;

selecting the mode of use of the battery desired by the user;

adapting to the specific charging device and battery by means of said identifier, downloading the charging characteristics which match the selected mode of use via the Internet, and writing the charging characteristics into the storage medium of the battery pack.

An information provider is connected to via the Internet, the mode of use that the user desires is selected, and the charging characteristics matching the mode of use selected is downloaded via the Internet and read into the storage medium of the charging device and battery. Because of this, the optimal charging characteristics can be matched with the desires of the user and can be written into the storage medium of the charging device and the battery.

In accordance with the more preferred teaching of the present invention, said mode of use of said battery desired by said user is either preservation of battery life or shortening the time of charging.

In order to be able to either select to preserve the life of the battery or to shorten the charging time, charging characteristics can be written into the storage medium of the charging device and battery which meet the desire of the user to either preserve the life of the battery or to shorten the charging time.

A method of updating the charging characteristics stored on a storage medium of a charging device and a battery via a computer communication line, according to the present invention comprises:

writing the history of use into the storage medium of the charging device and battery;

connecting said charging device and battery to a computer;

reading out the identifier of the charging device and battery connected to the computer via a communication line;

reading out the history of use read into the storage medium of the charging device and battery via the communication line, adapting to the specific charging device and battery by means of the identifier, downloading the charging characteristics which match the history of use via the communication line, and writing the charging characteristics into the storage medium of the charging device and the battery.

History of use is written into the storage medium of the charging device and battery. Then, the charging device and the battery is connected to a computer, the history of use is written into the storage medium of the charging device and battery is read out via a communication line, charging characteristics that match the history of use are downloaded via the communication line, and are written into the storage medium of the charging device and battery. Because of this, the actual mode of use can be matched with the optimal charging characteristics and be written into the storage medium of the charging device and the battery.

BRIEF DESCRIPTION OF THE DRAWINGS

FIG. 2(A) is a block diagram showing the construction of a charging device and a battery pack according to a first embodiment, and (B) is a view of a charging device connected to a computer;

FIG. 3(A) is a view of a charging device connected to a computer, and (B) is a view of a battery pack connected to a computer;

FIG. 4 is a view showing the contents of a map stored on an EEPROM of a charging device;

FIG. 6(A) and (B) are views of an image of a home page;

FIG. 8 (A) and (B) are views of an image of a home page according to a second embodiment;

DESCRIPTION OF THE PREFERRED EMBODIMENTS

In the following, a charging device and a method of charging according to one embodiment will be explained with reference to the figures.

Figure 1:
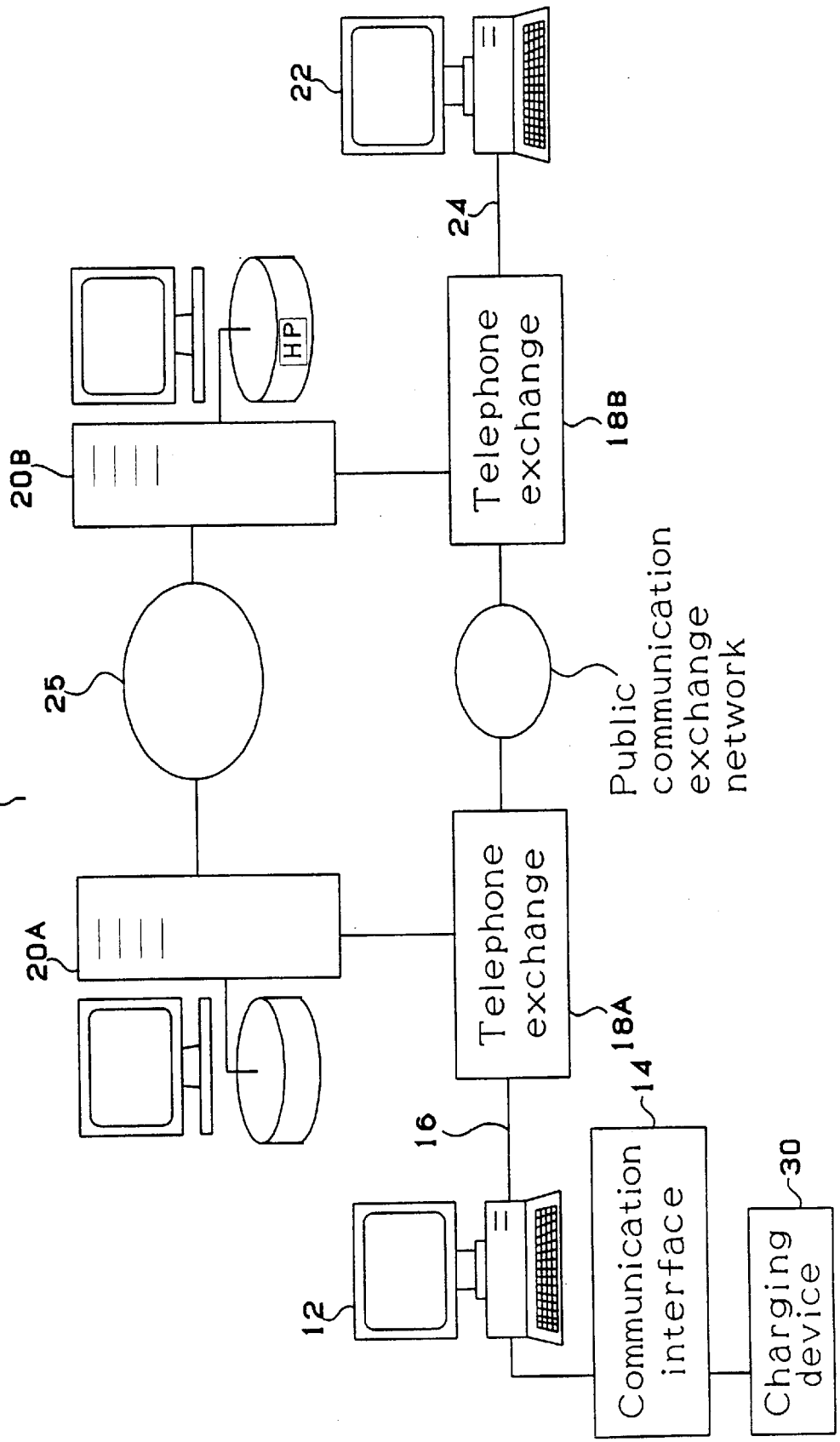
FIG. 1 is a view showing the organization of the Internet.

FIG. 1 shows the organization of a first embodiment of a charging device and a method of updating the charging characteristics of a battery via the Internet 10. The user's computer 12 is connected to telephone exchange 18A via a telephone line 16. Telephone exchange 18A is connected to server 20A. Server 20A is connected via a dedicated high speed line 25 to server 20B, which houses a home page for updating the charging characteristics of a charging device and battery. The home page on server 20B is connected via line 24 and telephone exchange 18B to the computer 22 belonging to the charging device and battery's manufacturer. The contents of the home page are updated by means of computer 22.

The user connects charging device 30 to computer 12 to a communication interface 14 interposed therebetween, and accesses the home page via the Internet in order to update the charging characteristics of the charging device 30.

The configuration of charging device 30 will now be explained. FIG. 2(A) is a block diagram which shows the configuration of charging device 10 and battery pack 50. Charging device 30 is comprised of a temperature detector 38 for detecting the temperature of a battery by means of an output value from a temperature sensor (thermistor) 56 in battery pack 50, an EEPROM 39 comprised of a recording medium for storing a map to control current levels (discussed below) and the identity of the model of the charging device, a control unit 34 which searches for a rise in temperature by differentiating the temperature output from the temperature detection section 38, searches the map based on the temperature and the rise in temperature and searches for an allowable current level with which the battery can be charged while suppressing a rise in the temperature of the battery, and outputs the allowable current level to a charging control unit 34, and the charging current control unit 34 for controlling a power supply circuit 32 based on the current level requested from the control unit 36 and adjusting the charging current for the battery.

Battery pack 50 includes a nickel hydride battery B, a temperature sensor (thermistor) 56 for detecting the temperature of the nickel hydride battery, and an identifier stored on EEPROM 54 for identifying the model of battery pack 50.

The configuration of the aforementioned map used for current control will now be explained with reference to FIG. 4.

With the battery, if the charging current is high, charging time is shortened but its temperature rises accordingly. Conversely, if the charging current is low, charging time is lengthened but the rise in temperature is smaller. The nickel metal hydride battery in particular possesses characteristics in which the temperature gradient (rise in temperature) varies greatly in accordance with the charging current used or its capacity in the fully charged state. Because of this, in this embodiment of the charging device, the condition of the battery is distinguished based on its absolute temperature and the rise in temperature, and the battery is charged with as high a current as possible while preventing the temperature of the battery from rising. That is, charging occurs by changing the level of current in accordance with the condition of the battery.

That is, when the temperature of the battery is high, are relatively low charging current is applied. Conversely, when the temperature is low, a relatively high charging current is applied. And, when the rise in temperature is high, are relatively low charging current is applied. Conversely, if the rise in temperature rise is small, a relatively high charging current is applied.

Because it serves to variably control the aforementioned current, the map provides the optimal current level for charging while suppressing a rise in temperature. The horizontal axis of the map indicates the absolute temperature T of a battery, and its vertical axis indicates a temperature difference dT/dt. That is, if the temperature of the battery is high and the rise in temperature rise is high (lower right side of the map), then a relatively low charging current is applied. If the temperature of the battery is high and the rise in temperature rise is low (upper right side of the map), a moderate level of charging current is applied. And, if the temperature of the battery is low and the rise in temperature is high (lower left side of the map), a moderate level of charging current is applied. If the temperature of the battery is low and the rise in temperature is low (upper left side of the map), a relatively high charging current is applied. That is, the optimum current levels are set on the map in order to achieve the desired charging time (approximately 20 minutes) and desired final temperature.

Based on the map, the charging time is determined from the region in which the absolute temperature T and the change in temperature dT/dt converge, and the charging current is controlled based on the charging level provided in this region. For example, when the battery temperature is between T3 and T4 and the change in battery temperature (charging temperature) is between X1 and X2, then the current level provided in region I24 is output.

That is, while charging occurs, the current level apparently moves within the regions at random based on the temperature and the change in the rise in temperature. In other words, before the battery is fully charged, the temperature of the battery rises, or, the rise in temperature is high. If a relatively small charging current region is selected, that is, after a region on the lower right side on the map shown in FIG. 4 is selected, the rise in temperature becomes smaller by decreasing the current, which corresponds to the upper portion of the region in the map.

Nonetheless, when the battery approaches the fully charged state, the rise in temperature becomes larger due to the characteristics of the nickel metal hydride battery. That is, due to the large rise in temperature, a lower region is selected on the map. Even if the battery is charged with a relatively low current, the rise in temperature remains large. Because of this principle, the battery charger in this embodiment continuously (for example, three times) takes measurements at predetermined intervals (for example, at intervals of several hundred seconds). When the rise in temperature is large as shown in the hatched regions of the map I31, I32, I33, I34 and I35, and when the temperature is high and the rise in temperature is moderate as in region I25, it is determined that the battery charging is complete and the charging is then stopped.

Figure 5:
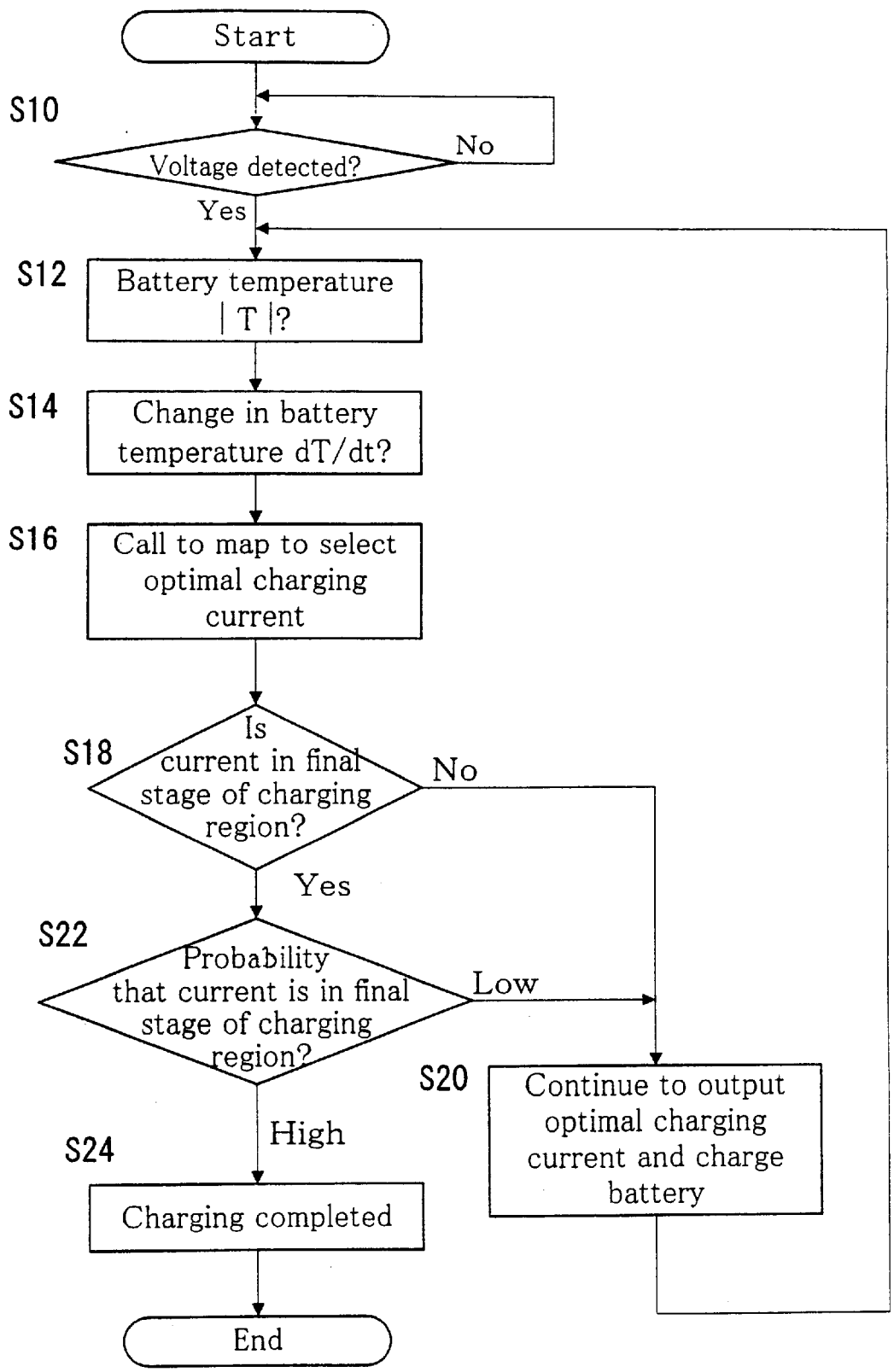
FIG. 5 is a flowchart showing the process according to the charging device of the first embodiment.

The detailed process of the charging device of this embodiment will be explained with reference to FIG. 2 (A) and the flow chart shown in FIG. 5.

First, when charging begins, control unit 36 of charging device 30 (shown in FIG. 2 (A)) adjusts the charging current and determines whether battery charging is completed in a predetermined cycle (less than 10 second intervals). First, it is determined whether battery pack 50 is installed by detecting a battery voltage (S10). That is, if battery pack 50 is installed (S10: Yes), the absolute temperature T of the nickel metal hydride battery is input (Step S12). Next, the absolute temperature T input is differentiated and the change in battery temperature dT/dt is calculated (Step S14). Then, based on the absolute temperature T and the change in temperature dT/dt, an optimum charging current is selected from the aforementioned map shown in FIG. 4 (Step Thereafter, control unit 36 determines whether it is in the final stage of charging region, i.e., hatched regions I31, I32, I33, I34 and I35 shown in the map of FIG. 4, in which the rise in temperature is high, and in region I25 in which the rise in temperature is moderate (Step S18). When charging begins, it is not in the final stage of charging region (S18 is No), and thus at Step 20 the charging current retrieved by means of the map is applied, the process returns to Step 12, and control of the charging current continues.

If charging continues while the level of current is changed in accordance with the absolute temperature T and the change in temperature dT/dt, the change in temperature dT/dt gradually increases, and the change in temperature dT/dt exceeds X2 and, for example, enters region I33. In this case, the aforementioned Step 18 is determined to be "Yes" (regions I31, I32, I33, I34, I35 and I25), and it is then determined whether there is a high probability of current being in the final stage of charging regions (Step S22). That is, it is determined that there is a high probability that it is in the final stage of charging regions if it enters the final stage of charging regions in three consecutive cycles. Here, the level of current is decreased on the next cycle, but at an absolute temperature T between T2 and T3, the change in temperature dT/dt is decreased to X1 to X2 in the next cycle. For example, in order for the current to be in region I23, the decision in Step 22 is "Low" and the process goes on to Step 20 in which charging continues with a variable charging current.

Meanwhile, if the current enters the final stage of charging region I25, in the next cycle it will enter the final stage of charging region I35, and in the next cycle after that it will enter the final stage of charging cycle I35. If the current enters a final stage of charging region in three consecutive cycles, the decision as to whether it is highly probable that the current has entered a final stage of charging region is "High", charging is completed (S24), and all processing is ended.

Next, the method of updating the map shown in FIG. 4 stored on EEPROM 30 in the charging device 30 will be explained.

First, as shown in FIG. 1, charging device 30 is connected to the serial port of the user's computer 12 via a communication interface 14. As shown in FIG. 2 (B), the communication interface 14 is directly connected to EEPROM 39, and as shown in FIG. 3 (A), is connected by means of control unit 36. The user then accesses the home page of the manufacturer of the charging device 30 with his computer via the Internet 10.

In the home page, as shown in FIG. 6 (A), an image is shown which serves to obtain the user's mode of use and his preferences.

In this image, the section reading "Model of charging device used" serves to confirm the model from the identifier read out from EEPROM 39 of charging device 30 (as discussed below), the section reading "Please select the battery to be used" serves to have the user select the battery pack to be used in the charging device, the section reading "Please select the tool primarily used" serves to have the user select the tool that he will primarily use, the section reading "Please select region in which it will be used" serves to have the user select the region in which the battery powered tool will be used, the section reading "Please select the mode of use desired" serves to have the user select the mode of use desired.

That is, by selecting each section in the image, information on the battery used, the power tool used, the region it is used in, and the mode of use desired is sent to server 20B shown in FIG. 1 via the Internet. That is, the user is asked to specify the power tool to be used because the optimal charge pattern differs according to whether there is a light load on the battery (battery powered drill) or a heavy load on the battery (battery powered chain saw). Further, the user is asked to specify the region in which the tool will be used because the optimal charge pattern differs according to whether the tool will be used in cold climates (north regions) or climates that are not cold (south regions). Then, when a preference for long battery life is desired as the mode of use, the charging pattern is set so as to lengthen the life of the battery as long as possible and avoid applying large currents, even if this lengthens the charging period. Conversely, when a preference for a short charging period is selected, the charging patter is set so as to apply a large current and shorten the charging period, even if this shortens the life of the battery.

Figure 7:
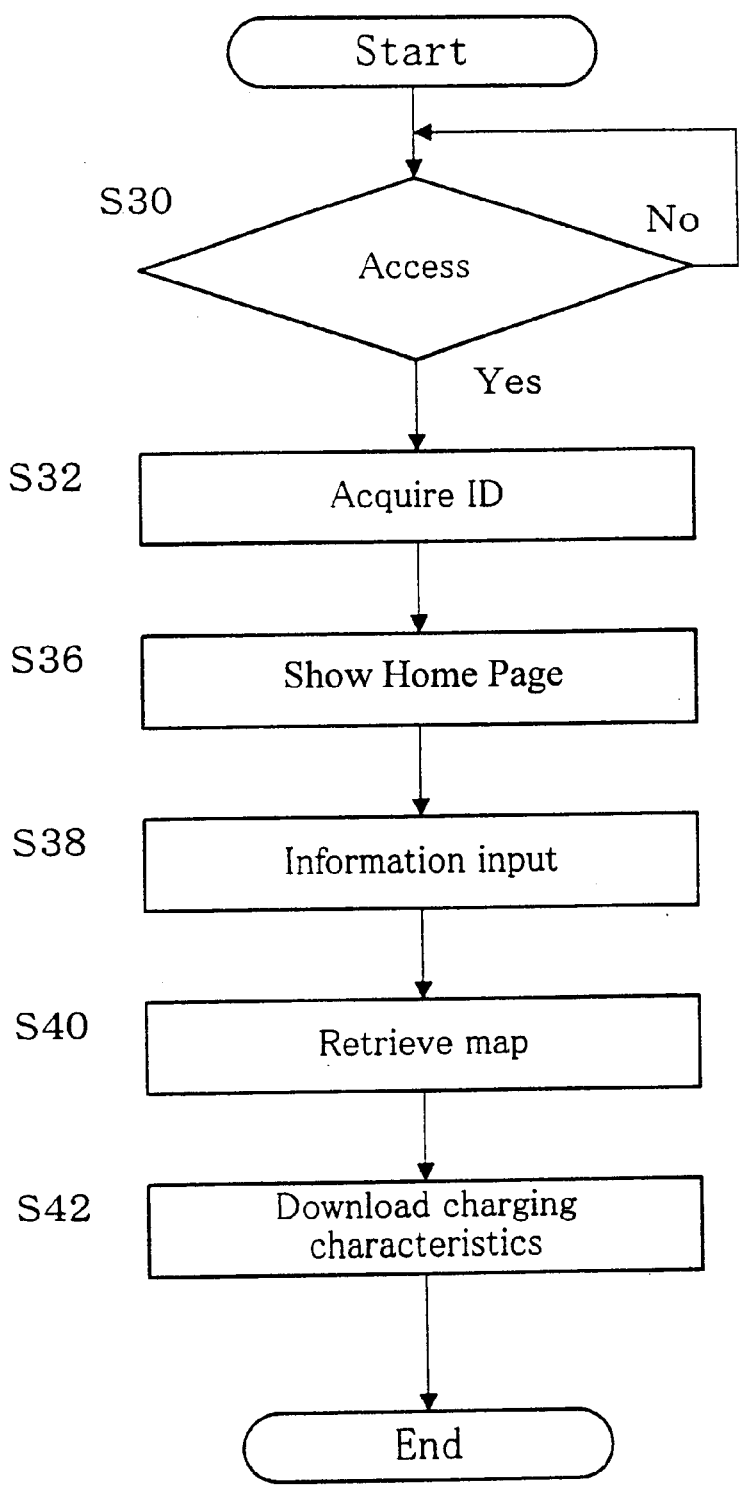
FIG. 7 is a flowchart showing the process at an information provider.

Next, the process in server 20B housing the home page will be explained with reference to FIG. 7.

First, a determination is made whether access has occurred (S30). That is, if there was access (S30: Yes), the identifier stored in EEPROM 39 in charging device 30 is read out (S32). Then, the model of the charging device that corresponds to the identifier is displayed on the home page as shown in FIG. 6 (A) (S36).

After this, as discussed above in FIG. 6 (A) the information selected on the screen is input (S38), and based on this input information, the optimal map is retrieved. That is, the optimal map is retrieved from amongst the plurality of maps stored on the hard disk on server 20B. Then, this map is downloaded to the user's computer 12 via the Internet (S42). By this means, computer 12 writes the map into the EEPROM 39 of charging device 30.

A modification of the first embodiment will now be explained.

In the aforementioned example, the map is stored in the charging device. The modification is that the map is stored in EEPROM 54 that comprises the storage medium of battery pack 50. In this case, as shown in FIG. 3 (B), the EEPROM 54 of battery pack 50 is connected to computer 12 via communication interface 14.

The home page of the modification is shown in FIG. 6 (B).

In this image, the section reading "Model of battery used" serves to confirm the model from the identifier read out from EEPROM 54 of battery pack 50, the section reading "Please select the charging device to be used" serves to have the user select the charging device to be used to charge the battery, the section reading "Please select the tool primarily used" serves to have the user select the tool that he will primarily use, the section reading "Please select region in which it will be used" serves to have the user select the region in which the battery powered tool will be used, the section reading "Please select the mode of use desired" serves to have the user select the mode of use desired. The process of updating the map by means of this modification is the same as that described above with respect to the first embodiment.

In the method of updating the charging characteristics of the charging device and battery of the first embodiment, the information provider (home page) is connected to, the mode of use of the battery desired by the user is selected, the charging characteristics that match the mode of use selected is downloaded via the Internet and write into the EEPROM of the battery. Because of this, the desires of the user can be matched with the charging characteristics of the charging device and battery, and can be write into the EEPROM of the battery.

In the above first embodiment, the mode of use of the battery desired by the user is downloaded via the Internet and written into the EEPROM of the battery. Instead of updating, it is possible to write charging control information for a new battery which has been developed after the charging device was sold into the charging device.

Figure 11:
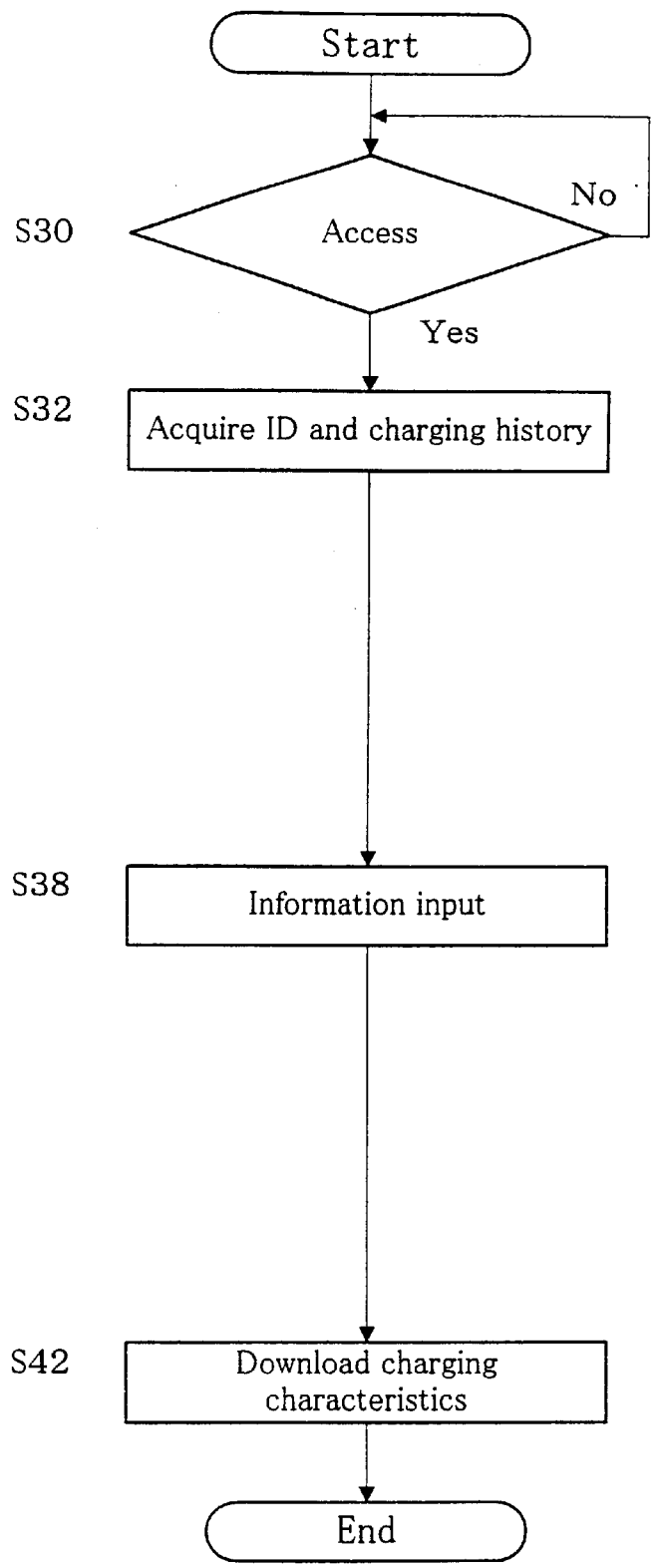
FIG. 11 is a flowchart showing the process at an information provider according to a modification of the first embodiment.

As shown in FIG. 11, a determination is made whether access has occurred (S30). That is, if there was access (S30 : Yes), the identifier stored in EEPROM 39 in charging device 30 and the identifier of the new battery are read out (S32). Then, the charging control information of the battery is input (S38). This control information is downloaded to the user's computer 12 via the Internet (S42). By this means, computer 12 writes the control information into the EEPROM 39 of charging device 30.

Figure 9:
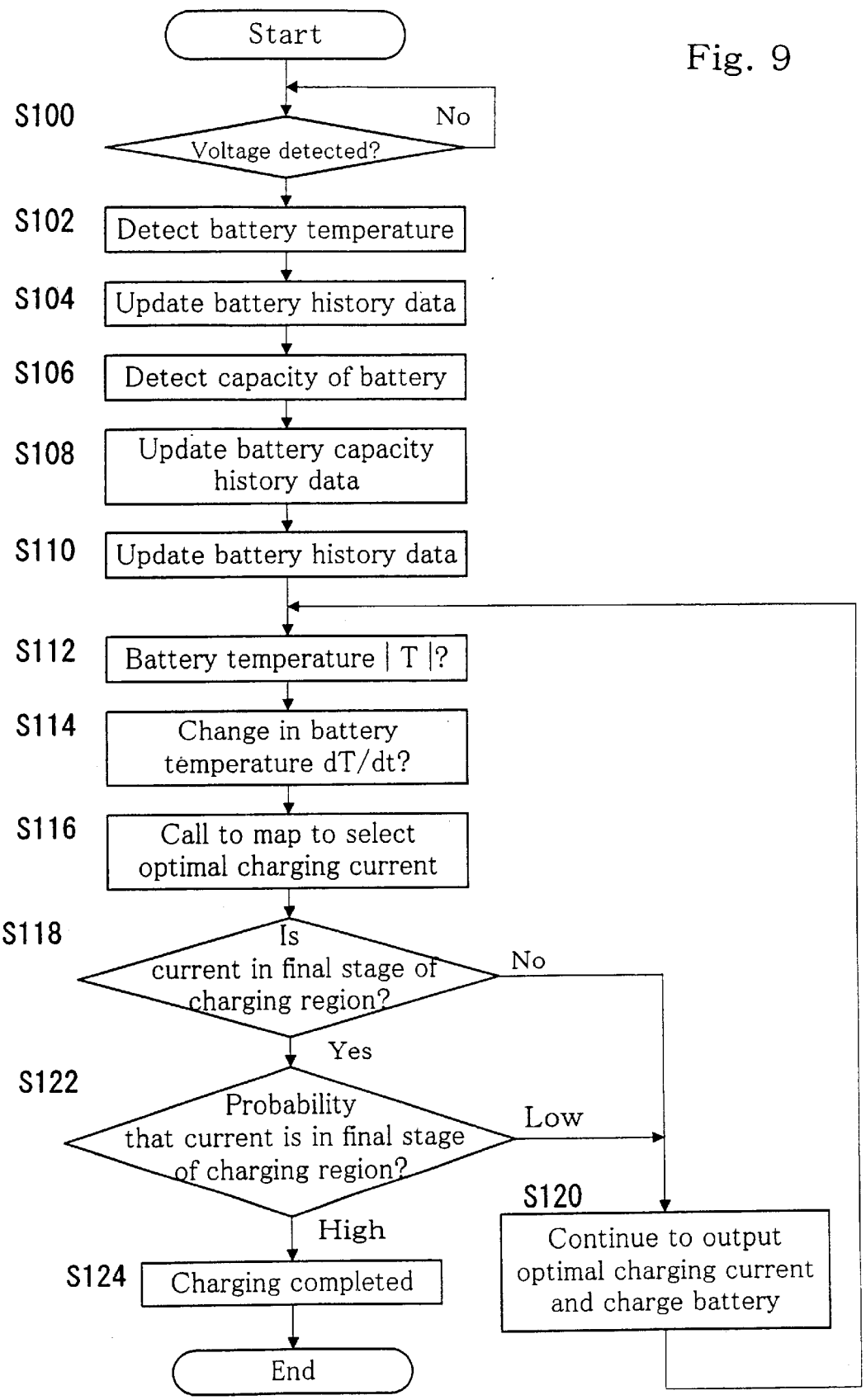
FIG. 9 a flowchart showing the process according to a charging device of a second embodiment.
Figure 10:
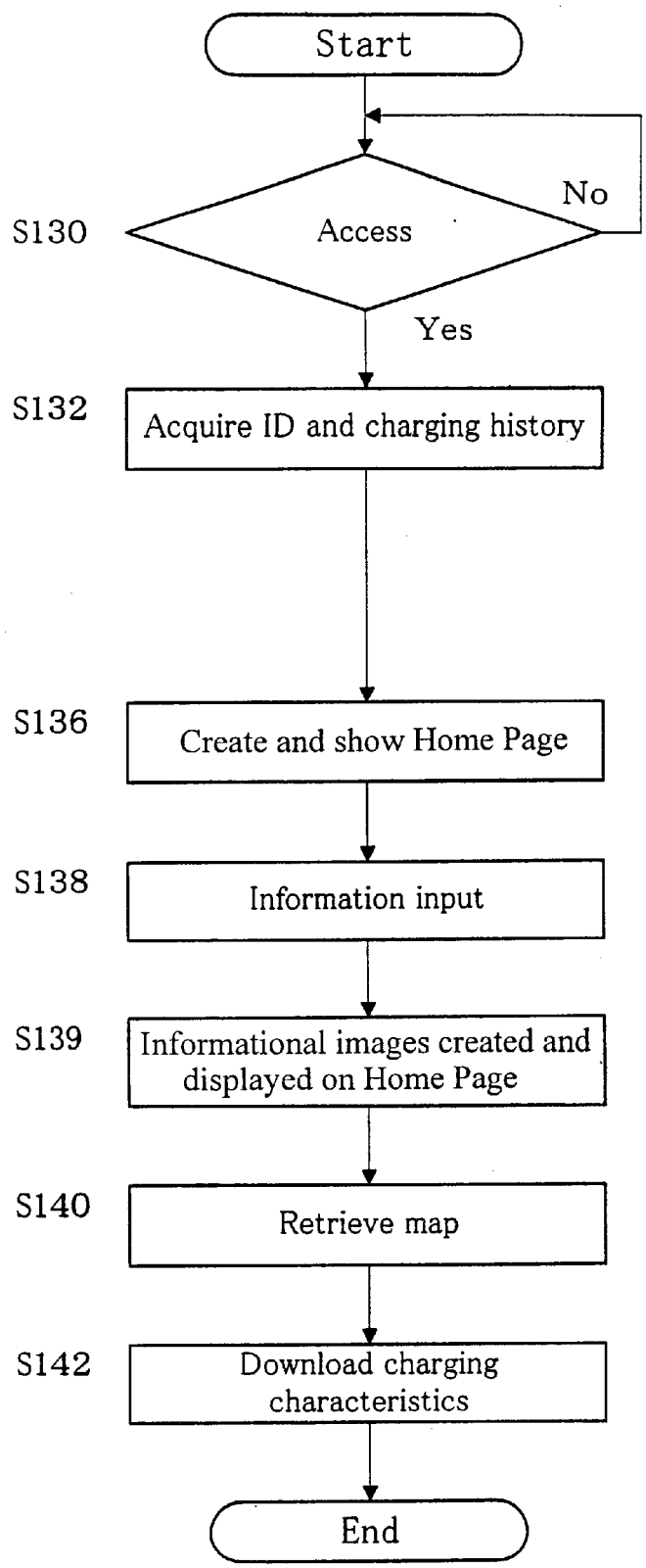
FIG. 10 is a flowchart showing the process at an information provider according to the second embodiment.

Next, a method of updating the charging characteristics of a charging device and a battery according to a second embodiment of the present invention will be explained by reference to FIGS. 8 to 10.

In the aforementioned first embodiment, the mode of use is selected from the home page. In the second embodiment, the charging history is stored in the EEPROM of the battery pack, the charging history is read out via the Internet, the optimal map (charging pattern) corresponding to the charging history is retrieved, and is written into the EEPROM. Further, because the configuration of the second charging device and battery pack is the same as that of the first embodiment described above in FIG. 2 (A), the second embodiment will be explained with reference to the same figure.

The charging history includes the temperature classification (low temperature (below 10 degrees Celsius), normal temperature (from 10 degrees Celsius up to 30 degrees Celsius), and high temperature (above 30 degrees Celsius)), and the battery capacity classification (over discharged - neglected for a long period of time (capacity below 0%), capacity 0% (capacity 0% to below 70%), capacity 100% (capacity above 70%)) taken from the beginning of the last 10 charges. The charging history also includes the number of times the battery has been charged. This stored history serves to determine whether a mode of use which shortened the life of the battery has been used. Specifically, it is to determine if recharging will occur in a state in which only a small amount of capacity has been expended, or if charging will occur in a state in which there has been a severe drop in voltage due to over-discharging or long-term neglect. That is, high temperatures mean when battery powered tools are used and charging is begun in a state in which heat continues to be generated by electrical discharge, or charging takes in a place where it receives the summertime sunlight. On the other hand, low temperature means charging outdoors during the wintertime. As discussed below, when history is stored that indicates that the life of the battery is shortened, the map will be updated to reduce the charging current and thereby lengthen the life of the battery.

The process of charging according to the stored charging history in the second embodiment will be explained with reference to FIG. 9. First, when charging begins, the control unit 36 of the charging device 30 (referring to FIG. 2 (A)) determines the adjustment of the charging current and the completion of charging according to a fixed cycle. First, it determines whether a battery voltage is detected and whether the battery pack 50 has been installed (S100). That is, if battery pack 50 has been installed (S100 : Yes), the absolute temperature T of the nickel hydride battery is detected (S102), and the classification of the temperature detected is updated in the data of EEPROM 54 (S104). Next, the capacity of the battery is detected (S106), and the classification of the capacity detected is updated in the data of EEPROM 54 (S108). After this, the number of times the battery has been charged is updated (S110), and hereinafter a charging process occurs (S110–S124) that is the same as Step 10–Step 24 of FIG. 5.

The image of the home page of the second embodiment will now be explained with reference to FIG. 8. The images of the selection of the mode of use and the mode of use desired by the user shown in FIG. 8 are the same as those of the aforementioned modification of the first embodiment referred to in FIG. 6 (B). However, in the second embodiment, the user's mode of use is analyzed from the charging history, and as shown in FIG. 8 (B), advice is provided to the user on the home page. For example, the message "Please begin charging after battery capacity has been exhausted" will be displayed to users who repeatedly charge the battery without exhausting its capacity. In addition, when from the charging history it is determined that the battery is normal, the message "Battery is normal" will be displayed. In addition, the life of the battery will be predicted from the charging history, and a message such as "Can be used 300 times or more" will be displayed.

Next, the process in server 20B housing the home page will be explained with reference to FIG. 10.

First, a determination is made whether access has occurred (S130). That is, if there was access (S130 : Yes), the identifier stored in EEPROM 39 in battery pack 50 is read out (S132). Then, the model of the battery pack that corresponds to the identifier is displayed on the home page as shown in FIG. 8 (A) (S136).

After this, the information selected on the screen shown in FIG. 8 (A) is input (S38), and based on this input information, the optimal map is retrieved. For example, in situations in which the history of the mode of use stored in the battery pack 50 indicates that the life of the battery is shortened, a map will be selected which extends battery life by reducing charging current. Conversely, in situations in which an ideal mode of use is stored in battery pack 50, a map will be selected in which charging current is increased and charging is completed in the shortest amount of time. After this, the aforementioned informational images are created according to the charging history and are displayed on the user's computer 12 (S139) Then, the retrieved map is downloaded to the user's computer 12 via the Internet. By this means, computer 12 writes the retrieved map into EEPROM 54 of battery pack 50.

Further, in the example above, although the charging pattern (map) of EEPROM 54 of battery pack 50 is updated entirely according to the charging history, it is also possible for charging pattern (map) of EEPROM 39 of the charging device to updated entirely according to the charging history. In addition, in the example above, although the charging pattern (map) is updated entirely over the Internet, in the second embodiment the charging pattern (map) can be updated through the use of a variety of computer communications.

In the second embodiment, the history of use is written into EEPROM 54 of battery pack 50. Then, the computer is connected to battery pack 50, the history of use read into EEPROM 54 of battery pack 50 is read out via the Internet, the charging characteristics (map) which match the history of use are downloaded via the Internet, and written into EEPROM 54 of battery pack 50. Because of this, the optimal charging characteristics can be matched with the actual mode of use and written into EEPROM 54.

In the above second embodiment, the history of use is input into the host computer. It is impossible, to input the information such as the charging history, the use of the charging device and a breakdown of the charging device into the computer under the device manufacture, to analyze input information and to search the mode of actual use of charging device and battery. Based on the result of the search, it is possible to search the market to obtain an index for developing a new product, and to supply various service.

Figure 12:
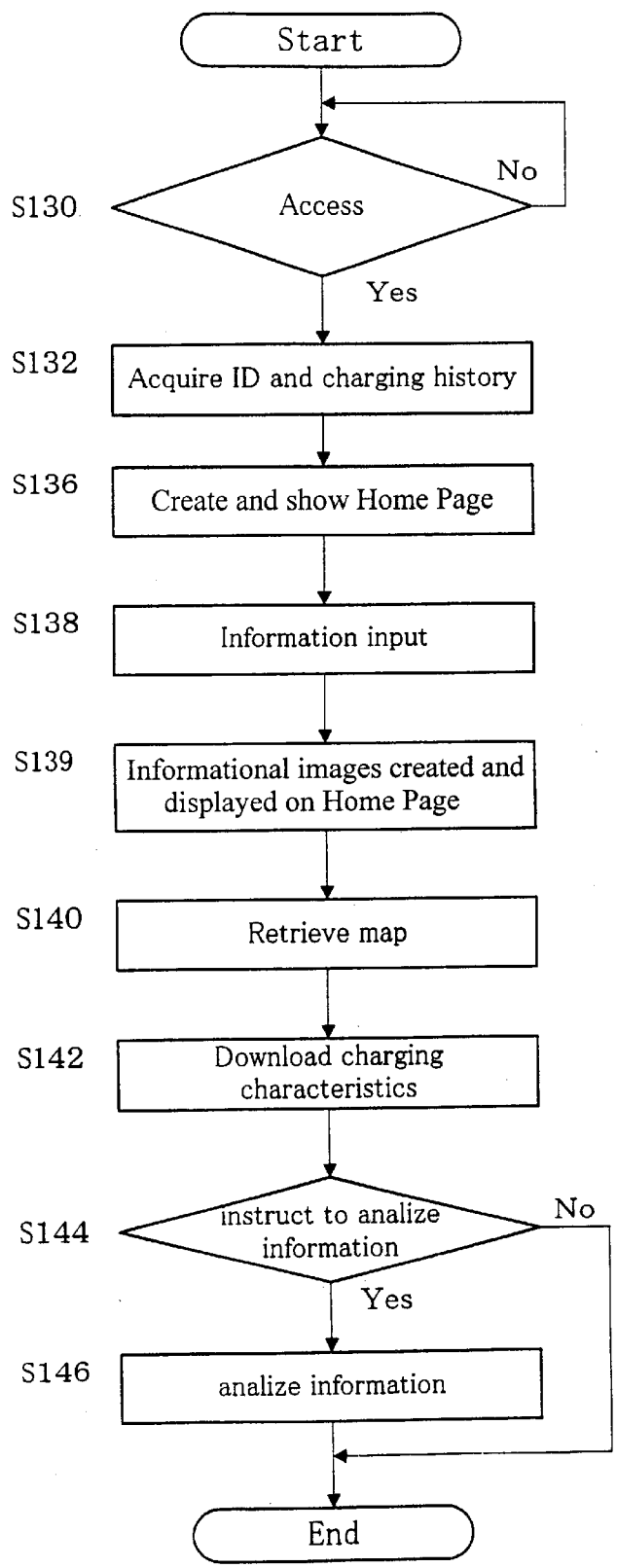
FIG. 12 is a flowchart showing the process at an information provider according to a modification of the second embodiment.

As shown in FIG. 12, if the analysis of the information is instructed (S144: Yes), computer 22 analyzes the information (S146). Based on the result of the analysis, it is possible to supply various service. For example, when a charging device is breakdown, a serviceman can be sent to repair the device.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. A method of updating the charging characteristics stored on a storage medium of a charging device and a battery via the Internet, comprising:

connecting the charging device and battery to a computer;

connecting to an information provider via the Internet, and selecting the mode of use of the battery that a user desires;

downloading via the Internet charging characteristics which match these selected mode of use, and writing the charging characteristics into the storage medium of the charging device and battery.

2. A method of updating the charging characteristics stored on a storage medium of a charging device and a battery via the Internet, comprising:

connecting the charging device and battery to a computer;

connecting to an information provider via the Internet, and reading out an identifier of the charging device and battery connected to the computer;

selecting the mode of use of the battery desired by the user;

adapting to the specific charging device and battery by means of said identifier, downloading the charging characteristics which match the selected mode of use via the Internet, and writing the charging characteristics into the storage medium of the battery pack.

3. The method of updating the charging characteristics of the charging device and the battery according to claim 1, wherein said mode of use of said battery desired by said user is either preservation of battery life or shortening the time of charging.

4. The method of updating the charging characteristics of the charging device and the battery according to claim 2, wherein said mode of use of said battery desired by said user is either preservation of battery life or shortening the time of charging.

5. A method of updating the charging characteristics stored on a storage medium of a charging device and a battery via a computer communication line, comprising:

writing the history of use into the storage medium of the charging device and battery;

connecting said charging device and battery to a computer;

reading out the identifier of the charging device and battery connected to the computer via a communication line;

reading out the history of use read into the storage medium of the charging device and battery via the communication line, adapting to the specific charging device and battery by means of the identifier, downloading the charging characteristics which match the history of use via the communication line, and writing the charging characteristics into the storage medium of the charging device and the battery.

* * * * *